(No Model.)
G. NAUMAN.
MACHINE FOR FORMING BICYCLE TIRES.
No. 421,423.              Patented Feb. 18, 1890.
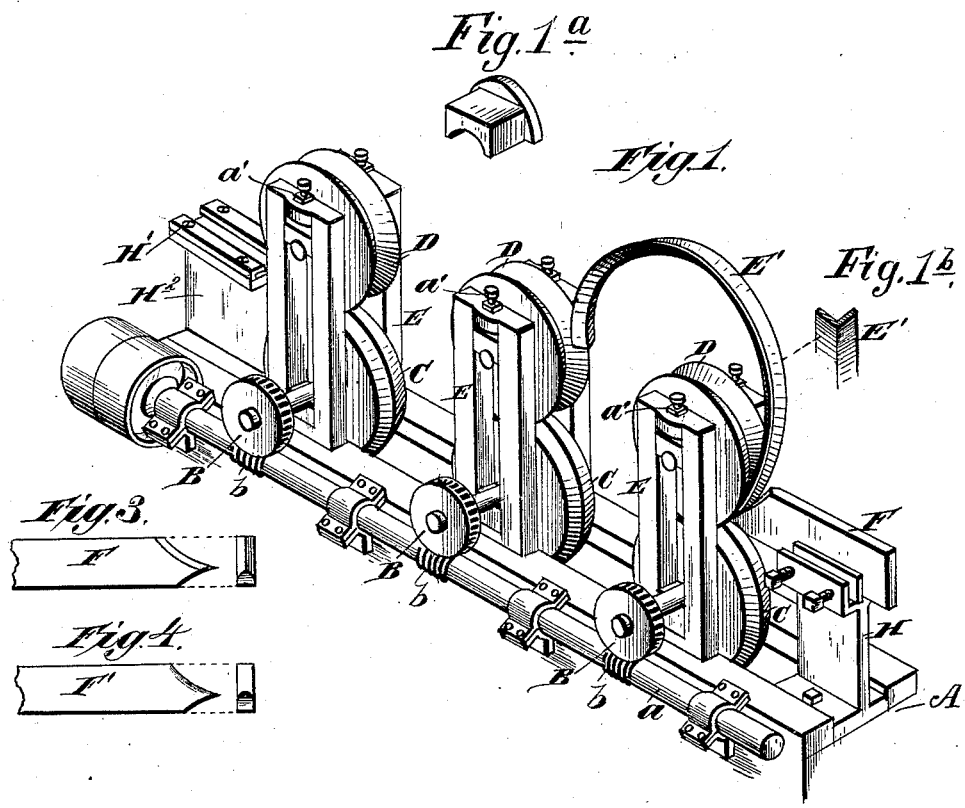
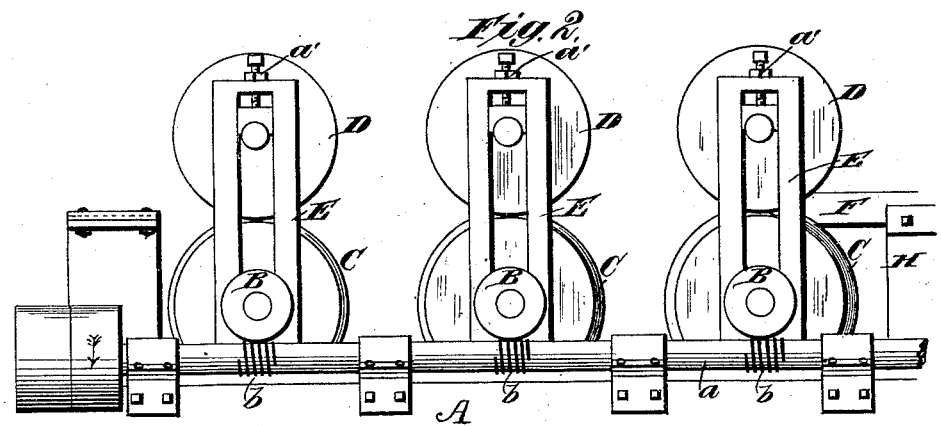
Witnesses.                Inventor:
                          George Nauman.
                          By Bond & Nire
                          Attys.

UNITED STATES PATENT OFFICE.

GEORGE NAUMAN, OF CANTON, OHIO.

MACHINE FOR FORMING BICYCLE-TIRES.

SPECIFICATION forming part of Letters Patent No. 421,423, dated February 18, 1890.

Application filed May 1, 1889. Serial No. 309,260. (No model.)

*To all whom it may concern:*

Be it known that I, GEORGE NAUMAN, a citizen of the United States, residing at Canton, in the county of Stark and State of Ohio, have invented certain new and useful Improvements in Machines for Forming Bicycle-Tires; and I do hereby declare that the following is a full, clear, and exact description of the same, reference being had to the annexed drawings, making a part of this specification, and to the letters of reference marked thereon, in which—

Figure 1 is an isometrical view showing the location of the rollers and a forming-die. Fig. 1ª is a detached view of one of the shaft-caps. Fig. 1ᵇ is a view showing a portion of the finished tire. Fig. 2 is a side elevation. Fig. 3 is a detached view of a die designed and calculated to form a V-shaped tire or band. Fig. 4 is a detached view of a die designed and calculated to form a U-shaped tire or band.

The present invention has relation to machines for forming bicycle-tires; and it consists in the different parts and combination of parts hereinafter described, and particularly pointed out in the claim.

Similar letters of reference indicate corresponding parts in all the figures of the drawings.

In the accompanying drawings, A represents the base-frame, which may be substantially of the form shown in the drawings. To one side of the frame A is journaled the shaft $a$, which is located substantially as shown, and is provided with the screws $b$, which are for the purpose of communicating rotary motion to the rolls by means of the screw-wheels B, said wheels being securely attached to the shafts of the lower rolls C. The rolls D are located directly above the rolls C. These rolls C and D are designed and calculated to form tires for bicycle-wheels from a flat piece of metal. The rolls C and D are held in proper position by means of the housings E, said housings being located substantially as shown in the drawings, and are attached to the frame A by suitable clamping-bolts or their equivalents. The rolls C and D are held firmly together by means of the set-screws $a'$, which set-screws are also for the purpose of regulating the pressure of the rolls C and D. The rolls C are provided upon their peripheries with a V-shaped flange or ridge, and the rolls D are provided upon their peripheries with a V-shaped groove. The V-shaped flange and groove of each set of rolls correspond one with the other as to the degree of flange or level. The degree of flanges are in the first set of rolls about twenty, in the second set about forty, and in the third or last set about sixty, degrees. It will be seen by this peculiar construction that the bar designed to be formed is worked or formed by degrees.

For the purpose of bending the tire or band E' in the form of a circle the dies F and F' are provided. The die F is provided with a concaved V-shaped portion, which is calculated to form a V-shaped tire or band. The die F' is provided with a concaved U-shaped portion, which is designed to form a U-shaped tire or band.

For the purpose of changing the diameters of the tires or bands the degree of concavity is varied in different dies. The diameters of the tires or bands may be varied by setting the die toward or from the last set of rolls, but only a small change can be made in the diameters of the tires or bands by changing the location of the die.

It will be seen that by my peculiar arrangement and construction I am enabled to form from a flat strip of metal a perfect and complete tire or band, and all that is necessary to be done after the strip has passed through the rolls is to unite the ends. By placing a die as illustrated in Fig. 1, the tire or band will be started to curve at its extreme end, thereby forming a tire of a continuous and uniform curve from end to end.

For the purpose of guiding and holding the metal bar from which the tire E is formed the guide-bars H' are provided and are located at the front of the machine proper, and are securely held in proper position by means of the support $H^2$.

The pressure-caps $a^2$ are located over the shafts of the upper rolls D D D, and are for the purpose of transmitting pressure to the lower rolls by means of the set-screw.

Having fully described my invention, what I claim as new, and desire to secure by Letters Patent, is—

The combination of the base-frame A, having journaled thereto the shaft $a$, provided with the screws $b$, the screw-wheels B, the rolls C, having different diameters, the rolls D, engaging the rolls C, said rolls C and D having grooves and flanges of different degrees of angularity, and a die opposite the last pair of rolls adapted to bend a tire or band in the form of a circle, the housings E, and the set-screws $a$ for adjusting the upper rolls with respect to the lower, substantially as and for the purpose specified.

In testimony that I claim the above I have hereunto subscribed my name in the presence of two witnesses.

GEORGE NAUMAN.

Witnesses:
JAMES STEEN,
F. W. BOND.